United States Patent
Vallinayagam et al.

(10) Patent No.: US 8,922,033 B2
(45) Date of Patent: Dec. 30, 2014

(54) SYSTEM FOR COOLING POWER GENERATION SYSTEM

(71) Applicant: General Electric Company, Schenectady, NY (US)

(72) Inventors: Sadhasivam Vallinayagam, Hyderabad (IN); Atanu Phukan, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/783,662

(22) Filed: Mar. 4, 2013

(65) Prior Publication Data

US 2014/0246863 A1 Sep. 4, 2014

(51) Int. Cl.
*H02K 9/02* (2006.01)
*F01P 7/12* (2006.01)
*F01P 1/00* (2006.01)

(52) U.S. Cl.
CPC ... *H02K 9/02* (2013.01); *F01P 7/12* (2013.01); *F01P 2001/005* (2013.01)
USPC ......................................................... 290/1 B

(58) Field of Classification Search
CPC . F01P 11/10; F01P 2060/08; F01P 2007/146; F01P 2025/13; F01P 2025/12; F01P 2031/20; B60K 11/085; B60K 11/04; B61C 5/02; F04D 29/703; F24F 2011/0002; F24F 3/0527; F24F 3/1603; H05K 7/20145; Y02B 30/746
USPC ................ 290/1 B, 44, 54, 55; 310/58, 60 R; 416/111, 119, 117
See application file for complete search history.

(56) References Cited

U.S. PATENT DOCUMENTS

| | | | |
|---|---|---|---|
| 1,643,192 A | | 9/1927 | Yeager |
| 1,712,519 A | | 5/1929 | Pipenhagen |
| 2,185,712 A | * | 1/1940 | Rowley .......................... 49/82.1 |
| 2,276,279 A | | 3/1942 | Asklund |
| 2,923,037 A | * | 2/1960 | Muhr ................. 49/41 |
| 3,210,003 A | | 10/1965 | Quinton |
| 3,786,891 A | * | 1/1974 | Vogelaar et al. ............. 180/68.4 |
| 3,901,310 A | * | 8/1975 | Strawn .......................... 165/216 |

(Continued)

FOREIGN PATENT DOCUMENTS

| | | |
|---|---|---|
| EP | 2441612 A1 | 4/2012 |
| GB | 587421 A | 4/1947 |
| GB | 1018598 A | 1/1966 |

OTHER PUBLICATIONS

European Search Report and Written Opinion issued in connection with corresponding EP Application No. 14156576.2 on Sep. 10, 2014.

*Primary Examiner* — Tulsidas C Patel
*Assistant Examiner* — Charles Reid, Jr.
(74) *Attorney, Agent, or Firm* — James W. Pemrick; Ernest G. Cusick; Frank A. Landgraff (57) ABSTRACT

A power generation system is provided having a genset comprising an engine mechanically coupled to a generator. The genset is configured to generate electrical power. A ventilation system has a ventilation inlet and a ventilation outlet, and the ventilation system is configured for cooling at least one of the engine and the generator. Both the ventilation inlet and ventilation outlet have an adjustable shutter configured for adjusting a flow volume of a coolant medium through the ventilation system.

12 Claims, 11 Drawing Sheets

(56) References Cited

U.S. PATENT DOCUMENTS

| | | | |
|---|---|---|---|
| 4,756,279 A | 7/1988 | Temmesfeld | |
| 4,924,826 A * | 5/1990 | Vinson | 123/195 C |
| 5,268,633 A * | 12/1993 | Balch | 324/74 |
| 5,474,427 A * | 12/1995 | Redetzke | 416/247 R |
| 5,669,311 A | 9/1997 | Hill et al. | |
| 5,724,924 A | 3/1998 | Michels | |
| 6,142,108 A | 11/2000 | Blichmann | |
| 6,309,178 B1 | 10/2001 | Kim et al. | |
| 6,854,544 B2 * | 2/2005 | Vide | 180/68.6 |
| 7,401,672 B2 | 7/2008 | Kurtz, Jr. et al. | |
| 8,161,919 B2 | 4/2012 | Klotz et al. | |
| 2004/0146395 A1 * | 7/2004 | Uselton | 415/119 |
| 2009/0026767 A1 * | 1/2009 | Petrounevitch | 290/53 |
| 2010/0193165 A1 * | 8/2010 | Kim et al. | 165/122 |
| 2010/0243351 A1 * | 9/2010 | Sakai | 180/68.1 |
| 2011/0115235 A1 | 5/2011 | Steffl | |
| 2012/0014807 A1 * | 1/2012 | Liang | 416/247 R |
| 2012/0110909 A1 * | 5/2012 | Crane et al. | 49/70 |

* cited by examiner

SYSTEM FOR COOLING POWER GENERATION SYSTEM

BACKGROUND OF THE INVENTION

The subject matter disclosed herein relates generally to a power generation system. More specifically, the subject matter disclosed herein relates to a system for controlling the flow of a cooling medium to improve power generation system efficiency.

Gensets are engine-generator sets, and are used to supply power in places where utility power is not available. Currently, gensets typically include engines connected directly to generators to produce electricity. In some cases the gensets are permanently installed and kept ready to supply power to critical loads during temporary interruptions of the utility power supply. Gensets may operate at a fixed speed to produce electricity at a grid frequency. The fixed speed may typically be 1500 rpm for a 50 Hz grid frequency, or 1800 (or 1200) rpm for a 60 Hz grid frequency.

In some cases, the output power required from the genset is below a rated value while the engine is still running at a fixed speed. This results in reduction in the engine efficiency. Most current gensets have engines that operate at a fixed speed, and these engines are typically connected to a fixed speed fan which forces a coolant medium (e.g., air) through a radiator. As the load on the machine varies due to variations in power demand, the fan operates at the same fixed speed and consumes the same amount of power. This also results in a waste of energy and reduces system efficiency. Therefore, it would be desirable to have a system that reduces the fan's contribution to efficiency loss.

BRIEF DESCRIPTION OF THE INVENTION

In an aspect of the present invention, a power generation system is provided having a genset comprising an engine mechanically coupled to a generator. The genset is configured to generate electrical power. A ventilation system has a ventilation inlet and a ventilation outlet, and the ventilation system is configured for cooling at least one of the engine and the generator. Both the ventilation inlet and ventilation outlet have an adjustable shutter configured for adjusting a flow volume of a coolant medium through the ventilation system.

In another aspect of the present invention, a power generation system is provided. The power generation system includes a genset having an engine mechanically coupled to a generator, and the genset is configured to generate electrical power. A ventilation system has a ventilation inlet and a ventilation outlet, and the ventilation system is configured for cooling at least one of the engine and the generator. One or more temperature sensors are disposed in or near the power generating system, and the one or more temperature sensors detect at least one of an air temperature, a cooling fluid temperature, an oil temperature, an engine temperature and/or a generator temperature. A controller is connected to the one or more temperature sensors, and the controller is configured to control a position of the adjustable shutter based on data received from the one or more temperature sensors. At least one of the ventilation inlet and ventilation outlet have an adjustable shutter configured for adjusting a flow volume of a coolant medium through the ventilation system based the data received from the one or more temperature sensors.

In yet another aspect of the present invention, a power generation system is provided having a genset with an engine mechanically coupled to a generator. The genset is configured to generate electrical power, and the engine has a cooling fan mechanically connected to the engine. The cooling fan is configured to operate at a substantially constant speed when the engine is operating under normal loads. A ventilation system has a ventilation inlet and a ventilation outlet, and the ventilation system is configured for cooling at least one of the engine and the generator. At least one of the ventilation inlet and ventilation outlet has an adjustable shutter configured for adjusting a flow volume of a coolant medium through the ventilation system.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments that also incorporate the recited features.

Figure 1:
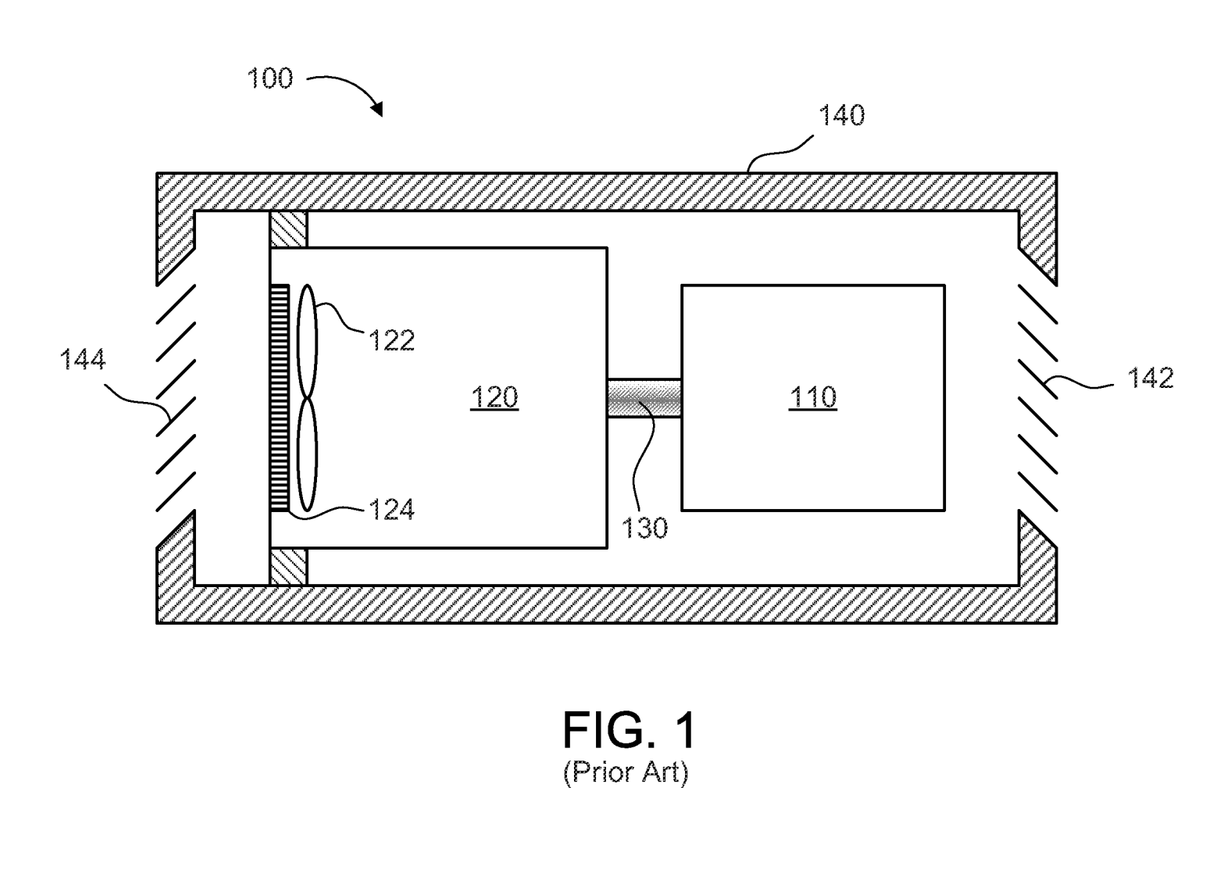
FIG. 1 illustrates a simplified schematic view of one known genset.

FIG. 1 illustrates a simplified schematic of one known genset 100. The genset 100 includes a generator 110 coupled to an engine 120 via shaft 130. The engine is cooled by a fan 122 and radiator 124. The generator 110 and engine 120 are housed within an enclosure 140 that has a plurality of fixed louvers 142, 144. The louvers 142 are inlet louvers and the louvers 144 are outlet louvers, as cooling air flow comes in through louvers 142 and exits through louvers 144. As can been seen, the louvers 142, 144 are fixed and angled downwardly, to limit entrance of water (or rain) into the enclosure 140. A disadvantage to this approach is that the louvers are fixed and the volume of cooling air cannot be controlled to improve machine efficiency.

Figure 2:
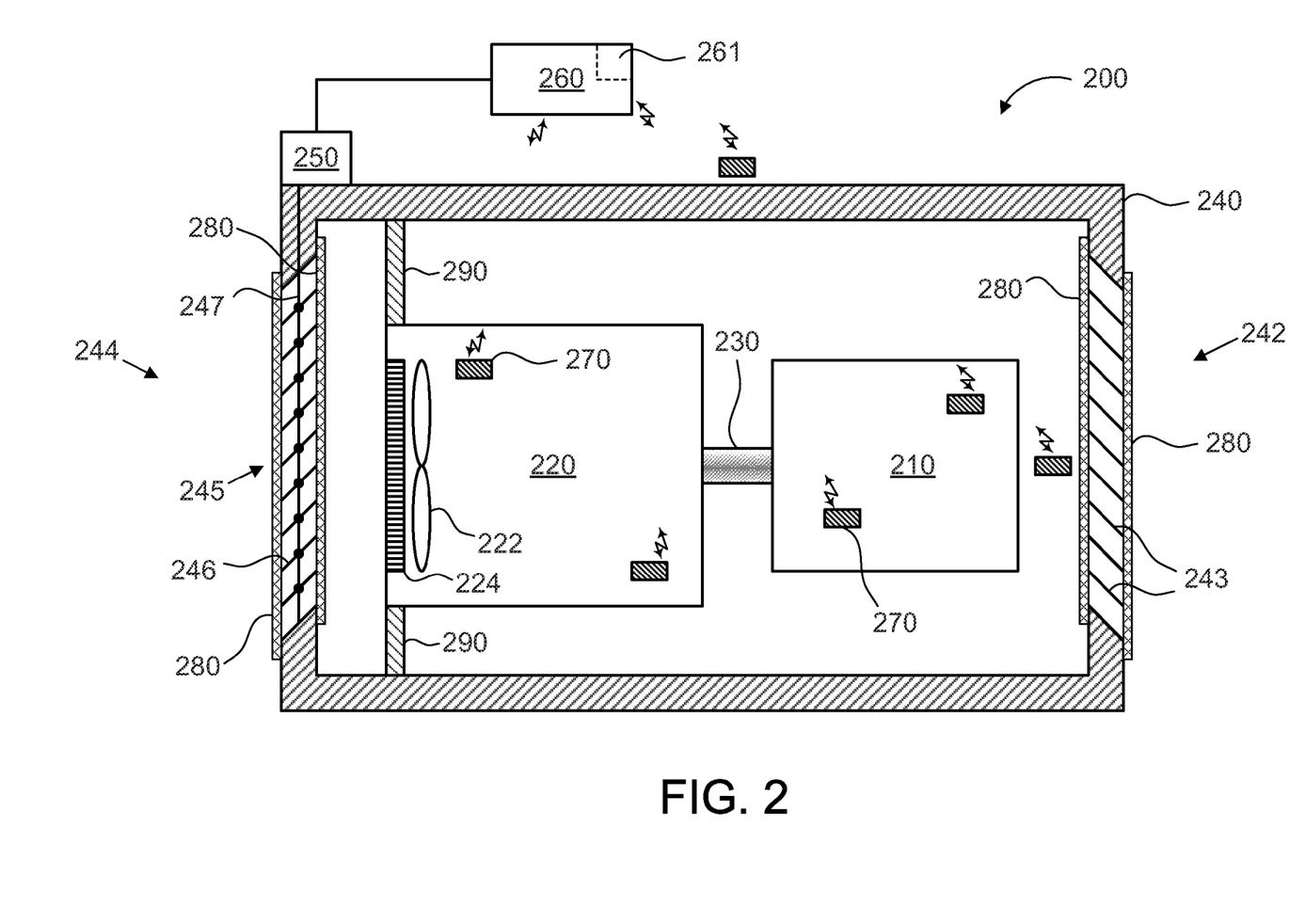
FIG. 2 illustrates a simplified schematic view of a power generation system having an adjustable shutter, according to an aspect of the present invention.

FIG. 2 illustrates a simplified schematic view of a power generation system 200, according to an aspect of the present invention. The power generation system 200, which may be a genset, includes an engine 220 mechanically coupled to a generator 210. In a genset application, the power generation system could be configured to generate electrical power. The generator 210 may be any conventional generator that is used to generate electrical power. Alternatively, generator 210 may be comprised of a motor. The engine 220 may be any liquid, gaseous or solid fueled engine (e.g., gasoline, diesel, natural gas, propane, etc.). The engine 220 includes a fan 222 mechanically coupled to the engine 220, and the fan 222 is configured to operate at a substantially constant speed when the engine is operating under normal loads. The fan forces a coolant medium (e.g., air) through a radiator 224.

The shaft 230 mechanically couples the generator 210 to the engine 220. Both the generator 210 and engine 220 are housed within an enclosure 240 that has a ventilation system. The ventilation system includes a ventilation inlet 242, a ventilation outlet 244 and one or more actuators 250. The ventilation inlet 242 includes multiple fixed louvers 243, and these louvers may be angled downwardly to limit ingress of water or rain. The ventilation outlet 244 includes an adjustable shutter 245 that is comprised of multiple outlet louvers 246 mechanically coupled to the actuator 250. As one example only, each outlet louver 246 may connected to a rod 247 that is moved by actuator 250. The actuator is configured to open or close the outlet louvers 246 (by varying amounts) to adjust or control the flow of a coolant medium (e.g., air) through the ventilation system or enclosure 240. The actuator 250 may be a motor, solenoid or any other suitable device, and the actuator is controlled by controller 260. The controller 260 is configured to instruct the actuator to open or close the outlet louvers 246 (or adjustable shutter 245) by specific amounts.

The controller 260 may also communicate with one or more temperature sensors 270 located in or near the power generation system 200. The temperature sensors 270 may be placed outside the enclosure 240, inside the enclosure 240, on or in the generator 210 and on or in the engine 220. For example, the temperature sensors 270 may be configured to detect an air temperature, a cooling fluid temperature, an oil temperature an engine temperature, a generator temperature or any other desired parameter as desired in the specific application. The air temperature may include, but is not limited to, air inlet temperature, internal temperature, external temperature, ambient temperature and air outlet temperature.

The generator temperature may include, but is not limited to, a winding temperature, core temperature and body temperature. The temperature sensors 270 may be connected to the controller via a wired or wireless communication medium. As a wireless example, each temperature sensor could take the form of a wireless RFID type tag that has unique identifying information, so that the controller can distinguish one tag from another (e.g., one tag may be assigned as a coolant temperature sensor, and another might be assigned as an ambient air temperature sensor). Based on the received temperature values, and possibly machine parameters, the controller 260 is configured to control the position of the adjustable shutter 245. The controller may also have multiple inputs, including but not limited to, generator load, generator status, engine load, engine status and any other load or input/status as desired in the specific application.

The controller 260 may also include a memory 261 that is used to store various operating events and data. This local storage in memory 261 enables the controller 260 to quickly respond to operating events and implement actions with reduced response time. As one example only, the controller can monitor for machine malfunctions (which may be based on specific temperature readings, machine RPM's, etc.), and in the event of a malfunction (e.g., overheating) the controller 260 can command the actuator 250 to fully open the adjustable shutter 245. In addition, the controller 260 could also generate an alarm if a malfunction (e.g., overheating) occurs, and this alarm could be sent to and/or displayed/announced in a control room, a remote monitoring station or a mobile device (e.g., a cellular telephone, wireless-enabled tablet/computer, etc.). The memory 261 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 261 may incorporate electronic, magnetic, optical, and/or other types of storage media. Note that the memory 261 can have a distributed architecture, where various components are situated remote from one another, but can be accessed by the controller 260. In summary, the controller 260 (and memory 261) may be configured to monitor and store events, and the local memory 261 reduces processing and response time of controller 260. Specific events to be monitored may generate alarms and/or cause the adjustable shutter to fully open or close. Although the memory 261 is not shown in subsequent Figures for clarity, it is to be understood that all the embodiments described herein may utilize memory 261.

A safety mesh 280 may also be installed on the inside and/or outside of the enclosure 240, located to cover the openings defined by the ventilation inlet 242 and/or ventilation outlet 244. The fan 222 could present a safety hazard if left exposed. The safety mesh 280 would prevent a person from reaching inside the enclosure and inadvertently injuring themselves on moving elements of the genset (e.g., fan 222, or louvers 226). Certain elements of the genset could also be hot (e.g., radiator 224, generator 210), so it may be desired to protect from these elements as well. The safety mesh is shown attached to both the inside and outside of the enclosure, but in the example shown in FIG. 2, a minimum desired application might provide a safety mesh 280 only on the outside of the enclosure at ventilation outlet 244 and/or on either the inside or outside of the enclosure at ventilation inlet 242. Although the safety mesh 280 is not shown in all subsequent Figures for clarity, it is to be understood that all the embodiments described herein may utilize safety mesh 280 on either the outlet or inlet, as desired in the specific application. Furthermore, blocking elements 290 may be used to direct air through the engine, fan and radiator, and these blocking elements are not shown in every Figure for clarity.

Overall power generation system efficiency can be improved as shown in the following examples. If the engine load decreases and/or the ambient temperature decreases, the controller 260 may command the actuator 250 to reduce the opening size of the adjustable shutter 245, thereby reducing the flow volume of the coolant medium. As the volume of air (or coolant medium) reduces, the load on the fan 222 reduces, and a result is that power generation system inefficiencies are also reduced. If the engine load increases and/or the ambient temperature increases, the controller 260 may command the actuator 250 to increase the opening size of the adjustable shutter 245, thereby increasing the flow volume of the coolant medium. Increased cooling under heavy loads or higher ambient or machine temperatures can improve power generation system efficiency or operation. For gensets with enclosures, the generator is located inside the enclosure, and the air inlet to the generator is also reduced because of the enclosure air flow passing through the lovers. Because of air flow reduction in the generator the windage loss (i.e., loss due to air flow) of the generator may also be reduced. This is an additional benefit of the power generation system.

Figure 3:
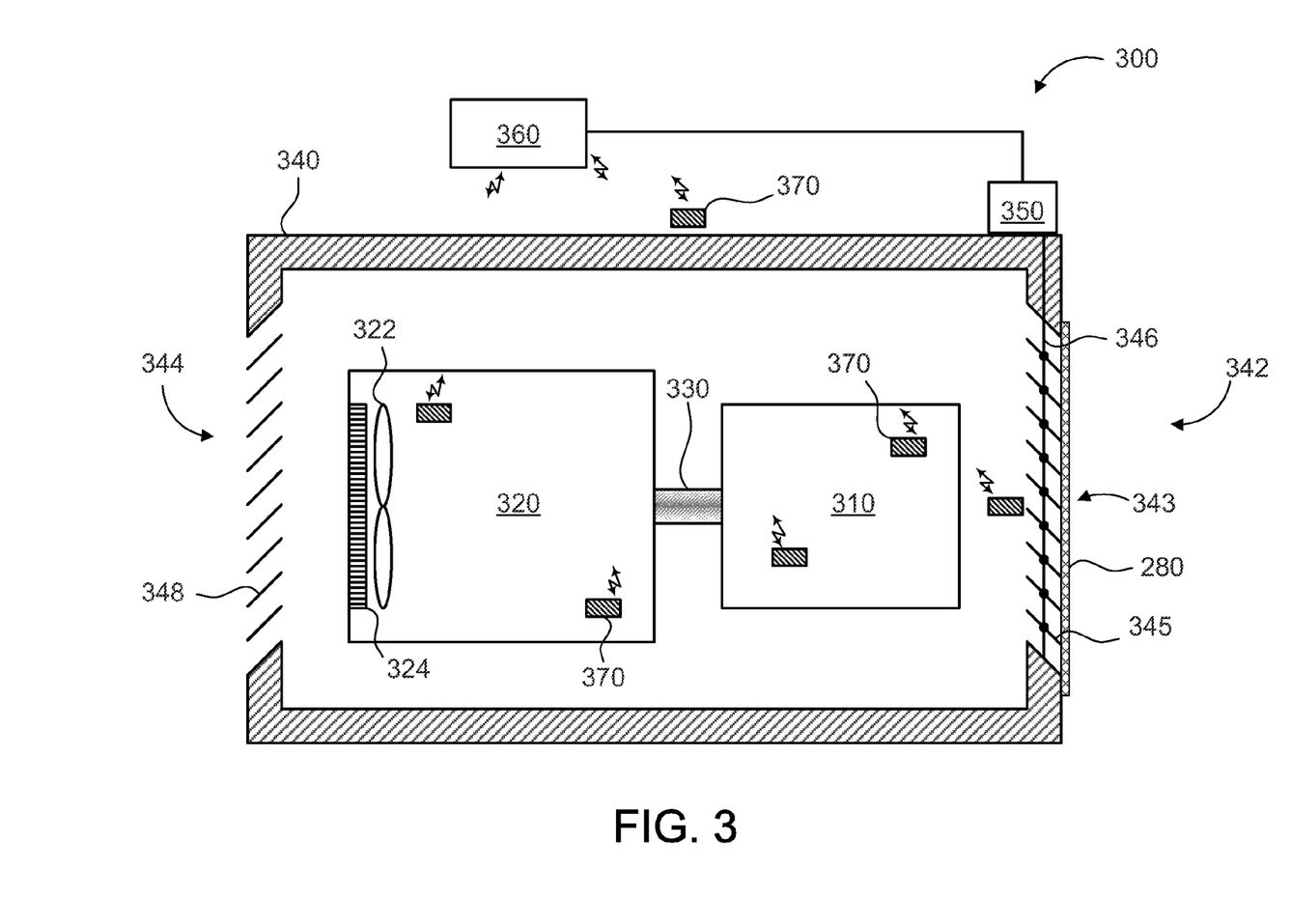
FIG. 3 illustrates a simplified schematic view of a power generation system having an adjustable shutter, according to an aspect of the present invention.

FIG. 3 illustrates a simplified schematic view of a power generation system 300, according to an aspect of the present invention. The power generation system 300, which may be a genset, includes an engine 320 mechanically coupled to a generator 310. In a genset application, the power generation system 300 could be configured to generate electrical power. The generator 310 may be any conventional generator that is used to generate electrical power. Alternatively, generator 310 may be comprised of a motor. The engine 320 may be any liquid, gaseous or solid fueled engine (e.g., gasoline, diesel, natural gas, propane, etc.). The engine 320 includes a fan 322 mechanically coupled to the engine 320, and the fan 322 is configured to operate at a substantially constant speed when the engine is operating under normal loads. The fan 322 forces a coolant medium (e.g., air) through a radiator 324.

The shaft 330 mechanically couples the generator 310 to the engine 320. Both the generator 310 and engine 320 are housed within an enclosure 340 that has a ventilation system. The ventilation system includes a ventilation inlet 342, a ventilation outlet 344 and one or more actuators 350. The ventilation inlet 342 includes an adjustable shutter 343 that is comprised of multiple inlet louvers 345 mechanically coupled to the actuator 350. As one example only, each inlet louver 345 may connected to a rod 346 that is moved by actuator 350. The actuator 350 is configured to open or close the inlet louvers 345 (by varying amounts) to adjust or control the flow of a coolant medium (e.g., air) through the ventilation system or enclosure 340. The actuator 350 may be a motor, solenoid or any other suitable device, and the actuator is controlled by controller 360. The controller 360 is configured to instruct the actuator to open or close the inlet louvers 345 (or adjustable shutter 343) by specific amounts. The ventilation outlet 344 includes multiple fixed louvers 348, and these louvers 348 may be angled downwardly to limit ingress of water or rain.

The controller 360 may also communicate with one or more temperature sensors 370 located in or near the power generation system 300. The temperature sensors 370 may be placed outside the enclosure 340, inside the enclosure 340, on or in the generator 310 and on or in the engine 320. For example, the temperature sensors 370 may be configured to detect an air temperature, a cooling fluid temperature, an oil temperature an engine temperature, a generator temperature or any other desired parameter as desired in the specific application. The temperature sensors 370 may be connected to the controller via a wired or wireless communication medium.

Figure 4:
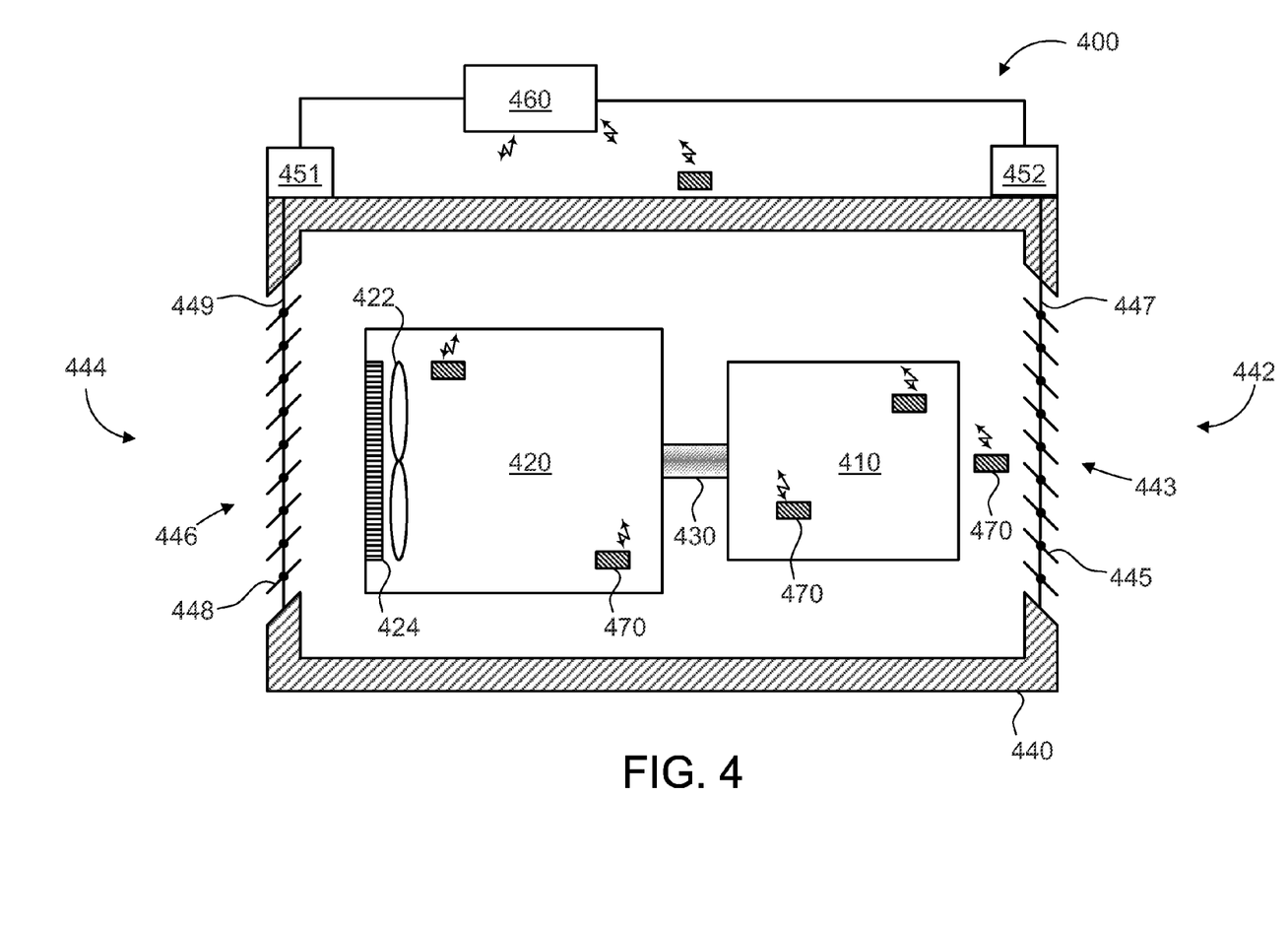
FIG. 4 illustrates a simplified schematic view of a power generation system having two adjustable shutters, according to an aspect of the present invention.

FIG. 4 illustrates a simplified schematic view of a power generation system 400, according to an aspect of the present invention. The power generation system 400, which may be a genset, includes an engine 420 mechanically coupled via shaft 430 to a generator 410. In a genset application, the power generation system 400 could be configured to generate electrical power. The generator 410 may be any conventional generator that is used to generate electrical power. Alternatively, generator 410 may be comprised of a motor. The engine 420 may be any liquid, gaseous or solid fueled engine (e.g., gasoline, diesel, natural gas, propane, etc.). The engine 420 includes a fan 422 mechanically coupled to the engine 420, and the fan 422 is configured to operate at a substantially constant speed when the engine is operating under normal loads. The fan 422 forces a coolant medium (e.g., air) through a radiator 424.

Both the generator 410 and engine 420 are housed within an enclosure 440 that has a ventilation system. The ventilation system includes a ventilation inlet 442, a ventilation outlet 444 and one or more actuators 451, 452. The ventilation inlet 442 includes an adjustable shutter 443 that is comprised of multiple inlet louvers 445 mechanically coupled to the actuator 452. As one example only, each inlet louver 445 may connected to a rod 447 that is moved by actuator 452. The actuator 452 is configured to open or close the inlet louvers 445 (by varying amounts) to adjust or control the flow of a coolant medium (e.g., air) through the ventilation system or enclosure 440. The ventilation outlet 444 also includes an adjustable shutter 446 that is comprised of multiple outlet louvers 448 mechanically coupled to the actuator 451. As one example only, each outlet louver 448 may connected to a rod 449 that is moved by actuator 451. The actuator 451 is configured to open or close the outlet louvers 448 (by varying amounts) to adjust or control the flow of a coolant medium (e.g., air) through the ventilation system or enclosure 440. The actuators 451, 452 may be a motor, solenoid or any other suitable device, and the actuators are controlled by controller 460. The controller 460 is configured to instruct the actuators to open or close the inlet louvers 445 (or adjustable shutter 443) and/or outlet louvers 448 (or adjustable shutter 446) by specific amounts.

The controller 460 may also communicate with one or more temperature sensors 470 located in or near the power generation system 400. The temperature sensors 470 may be placed outside the enclosure 440, inside the enclosure 440, on or in the generator 410 and on or in the engine 420. For example, the temperature sensors 470 may be configured to detect an air temperature, a cooling fluid temperature, an oil temperature an engine temperature, a generator temperature or any other desired parameter as desired in the specific application. The temperature sensors 470 may be connected to the controller via a wired or wireless communication medium.

Figure 5:
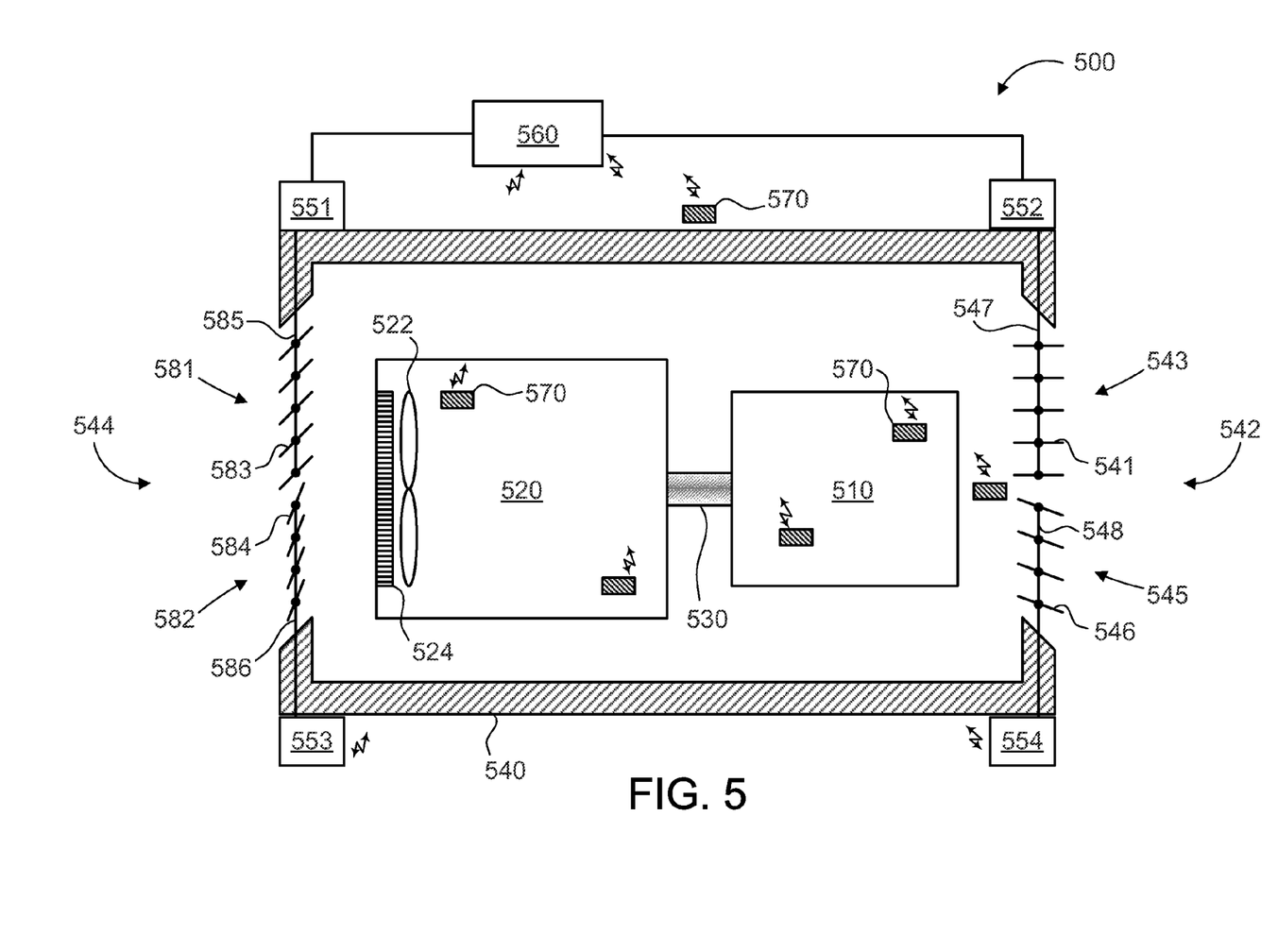
FIG. 5 illustrates a simplified schematic view of a power generation system having adjustable shutters with multiple zones, according to an aspect of the present invention.

FIG. 5 illustrates a simplified schematic view of a power generation system 500, according to an aspect of the present invention. The power generation system 500, which may be a genset, includes an engine 520 mechanically coupled via shaft 530 to a generator 510. In a genset application, the power generation system 500 is configured to generate electrical power. The engine 520 includes a fan 522 mechanically coupled to the engine 520, and the fan 522 is configured to operate at a substantially constant speed when the engine is operating under normal loads. The fan 522 forces a coolant medium (e.g., air) through a radiator 524.

Both the generator 510 and engine 520 are housed within an enclosure 540 that has a ventilation system. The ventilation system includes a ventilation inlet 542, a ventilation outlet 544 and one or more actuators 551, 552, 553 and 554. The ventilation inlet 542 includes two zones of adjustable shutters 543 and 545. Adjustable shutter 543 includes multiple inlet louvers 541 mechanically coupled to the actuator 552. Adjustable shutter 545 includes multiple inlet louvers 546 mechanically coupled to the actuator 554. As one example only, the inlet louvers 541 may connected to a rod 547 that is moved by actuator 552, and the inlet louvers 546 may connected to a rod 548 that is moved by actuator 554. The actuators 552, 554 are configured to open or close the inlet louvers 541, 546 (by varying amounts) to adjust or control the flow of a coolant medium (e.g., air) through the ventilation system or enclosure 540.

The ventilation outlet 544 may also include two zones of adjustable shutters 581 and 582. Adjustable shutter 581 includes multiple outlet louvers 583 mechanically coupled to the actuator 551. Adjustable shutter 582 includes multiple outlet louvers 584 mechanically coupled to the actuator 553. As one example only, the outlet louvers 583 may be connected to a rod 585 that is moved by actuator 551, and the outlet louvers 584 may be connected to a rod 586 that is moved by actuator 553. The actuators 551, 553 are configured to open or close the outlet louvers 583, 584 (or adjustable shutters 581, 582) to adjust or control the flow of a coolant medium (e.g., air) through the ventilation system or enclosure 540. The multiple zones of adjustable shutters enables more precise cooling of specific regions of the power generation system 500. As one example only, by opening the top two adjustable shutters (543, 581) more than the bottom two adjustable shutters (545, 582), more cooling air can be directed over the upper portions of the generator 510 and engine 520. This targeted and controllable configuration for cooling has demonstrated substantially improved machine efficiencies, and the amount of machine efficiency improvement was unexpected.

The controller 560 may also communicate with one or more temperature sensors 570 located in or near the power generation system 500. The temperature sensors 570 may be placed outside the enclosure 540, inside the enclosure 540, on or in the generator 510 and on or in the engine 520. For example, the temperature sensors 570 may be configured to detect an air temperature, a cooling fluid temperature, an oil temperature an engine temperature, a generator temperature or any other desired parameter as desired in the specific application. The temperature sensors 570 may be connected to the controller via a wired or wireless communication medium.

Figure 6:
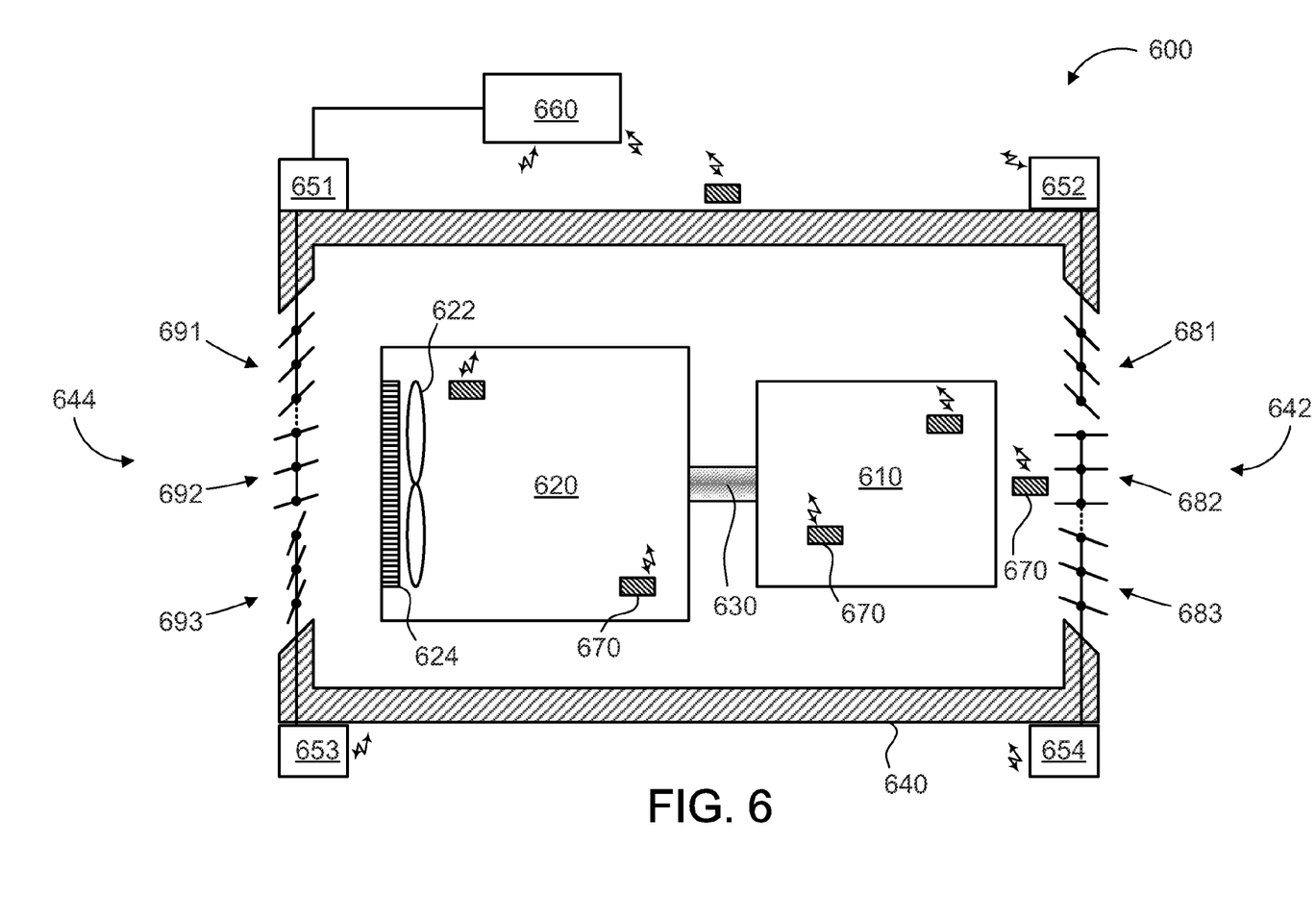
FIG. 6 illustrates a simplified schematic view of a power generation system having adjustable shutters with multiple zones, according to an aspect of the present invention.

FIG. 6 illustrates a simplified schematic view of a power generation system 600, according to an aspect of the present invention. The power generation system 600, which may be a genset, includes an engine 620 mechanically coupled via shaft 630 to a generator 610. In a genset application, the power generation system 600 is configured to generate electrical power. The engine 620 includes a fan 622 mechanically coupled to the engine 620, and the fan 622 is configured to operate at a substantially constant speed when the engine is operating under normal loads. The fan 622 forces a coolant medium (e.g., air) through a radiator 624.

Both the generator 610 and engine 620 are housed within an enclosure 640 that has a ventilation system. The ventilation system includes a ventilation inlet 642, a ventilation outlet 644 and one or more actuators 651, 652, 653 and 654. The ventilation inlet 642 includes two or more zones (three are shown) of adjustable shutters 681, 682, 683. Each adjustable shutter 681, 682, 683 includes multiple inlet louvers mechanically coupled to the actuators 652, 654. Adjustable shutter 681 includes multiple inlet louvers mechanically coupled to the actuator 652. Adjustable shutters 682 and 683 both include multiple inlet louvers and are mechanically coupled to the actuator 654. Actuator 654 includes two controlling rods to individually and selectively control each adjustable shutter. For example, the actuator 654 may include two motors where each motor is connected to a different adjustable shutter via a different rod. The actuators 652, 654 are configured to open or close the adjustable shutters 681, 682, 683 (by varying amounts) to adjust or control the flow of a coolant medium (e.g., air) through the ventilation system or enclosure 640.

The ventilation outlet 644 also includes two or more zones (three are shown) of adjustable shutters 691, 692, 693. Each adjustable shutter 691, 692, 693 includes multiple outlet louvers mechanically coupled to the actuators 651, 653. Adjustable shutter 693 includes multiple inlet louvers mechanically coupled to the actuator 653. Adjustable shutters 691 and 692 both include multiple inlet louvers and are mechanically coupled to the actuator 651. Actuator 651 includes two controlling rods to individually and selectively control each adjustable shutter. For example, the actuator 651 may include two motors where each motor is connected to a different adjustable shutter via a different rod. The actuators 651, 653 are configured to open or close the adjustable shutters 691, 692, 693 (by varying amounts) to adjust or control the flow of a coolant medium (e.g., air) through the ventilation system or enclosure 640.

The multiple zones of adjustable shutters enables even more precise cooling of specific regions of the power generation system 600. As one example only, by opening the middle two adjustable shutters (682, 692) more than the other adjustable shutters (681, 683, 691, 693), more cooling air can be directed over the middle portions of the generator 610 and engine 620. This targeted and controllable configuration for cooling has demonstrated substantially improved machine efficiencies, and the amount of machine efficiency improvement was unexpected.

The controller 660 may also communicate with one or more temperature sensors 670 located in or near the power generation system 600. The temperature sensors 670 may be placed outside the enclosure 640, inside the enclosure 640, on or in the generator 610 and on or in the engine 620. For example, the temperature sensors 670 may be configured to detect an air temperature, a cooling fluid temperature, an oil temperature an engine temperature, a generator temperature or any other desired parameter as desired in the specific application. The temperature sensors 670 may be connected to the controller via a wired or wireless communication medium.

Figure 7:
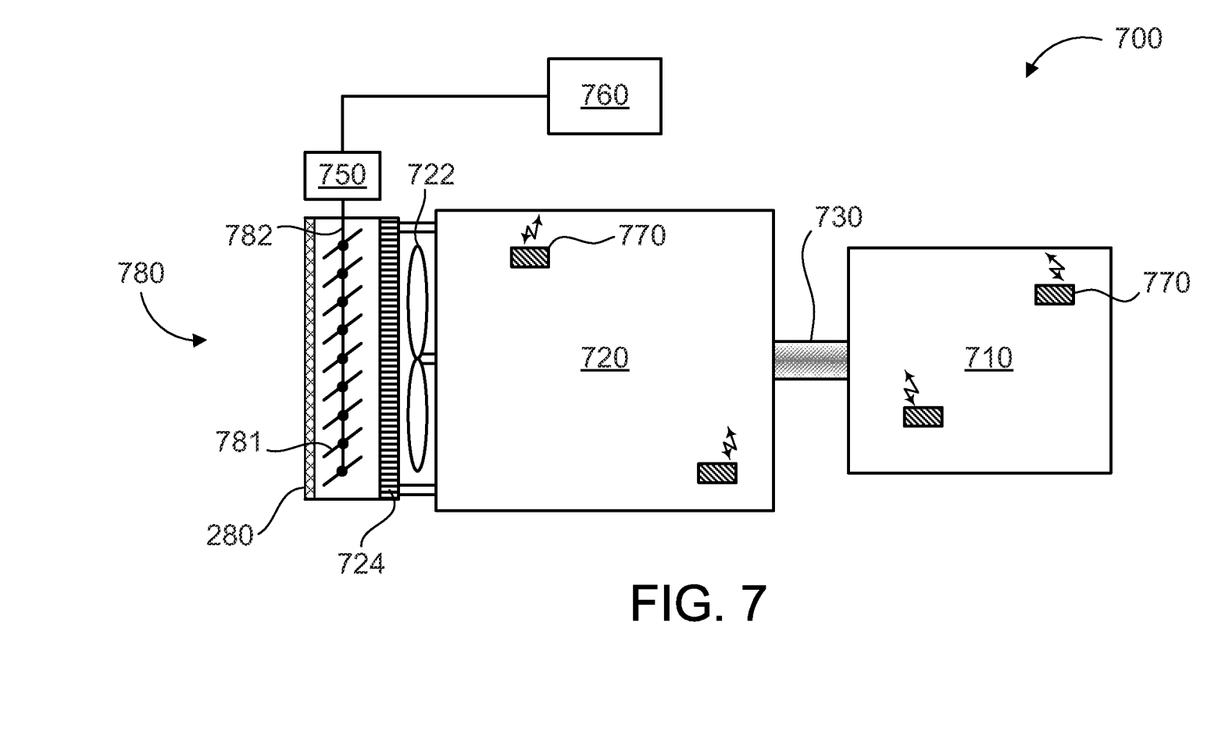
FIG. 7 illustrates a simplified schematic view of a power generation system having an adjustable shutter, according to an aspect of the present invention.

FIG. 7 illustrates a simplified schematic view of a power generation system 700, according to an aspect of the present invention. The power generation system 700, which may be a genset, includes an engine 720 mechanically coupled via shaft 730 to a generator 710. In a genset application, the power generation system 700 is configured to generate electrical power. The engine 720 includes a fan 722 mechanically coupled to the engine 720, and the fan 722 is configured to operate at a substantially constant speed when the engine is operating under normal loads. The fan 722 forces a coolant medium (e.g., air) through a radiator 724.

The engine 720 is cooled by a ventilation system. The ventilation system includes a ventilation inlet (which is the space around the engine and behind the fan), a ventilation outlet (which is downstream of the adjustable shutter 780), the adjustable shutter 780 and actuators 750. The fan 722 forces a coolant medium (e.g., air) through the radiator 724. The adjustable shutter 780 is comprised of multiple louvers 781 mechanically coupled to the actuator 750. As one example only, each louver 781 may be connected to a rod 782 that is moved by actuator 750. The actuator 750 is configured to open or close the louvers 781 (by varying amounts) to adjust or control the flow of a coolant medium through the radiator 724. The actuator 750 may be a motor, solenoid or any other suitable device, and the actuator is controlled by controller 760. The controller 760 is configured to instruct the actuator to open or close the louvers 781 (or adjustable shutter 780) by specific amounts.

The controller 760 may also communicate with one or more temperature sensors 770 located in or near the power generation system 700. The temperature sensors 770 may be placed near, inside or outside the generator 710 and the engine 720. For example, the temperature sensors 770 may be configured to detect an air temperature, a cooling fluid temperature, an oil temperature an engine temperature, a generator temperature or any other desired parameter as desired in the specific application. The temperature sensors 770 may be connected to the controller 760 via a wired or wireless communication medium. Based on the received temperature values, and possibly machine parameters, the controller 760 is configured to control the position of the adjustable shutter 780.

Overall power generation system efficiency can be improved as shown in the following examples. If the engine load decreases and/or the ambient temperature decreases, the controller 760 may command the actuator 750 to reduce the opening size of the adjustable shutter 780, thereby reducing the flow volume of the coolant medium and the load on fan 722. As the volume of air (or coolant medium) reduces, the load on the fan 722 reduces, and a result is that power generation system inefficiencies are also reduced. If the engine load increases and/or the ambient temperature increases, the controller 760 may command the actuator 750 to increase the opening size of the adjustable shutter 780, thereby increasing the flow volume of the coolant medium. Increased cooling under heavy loads or higher ambient or machine temperatures can improve power generation system efficiency or operation.

Figure 8:
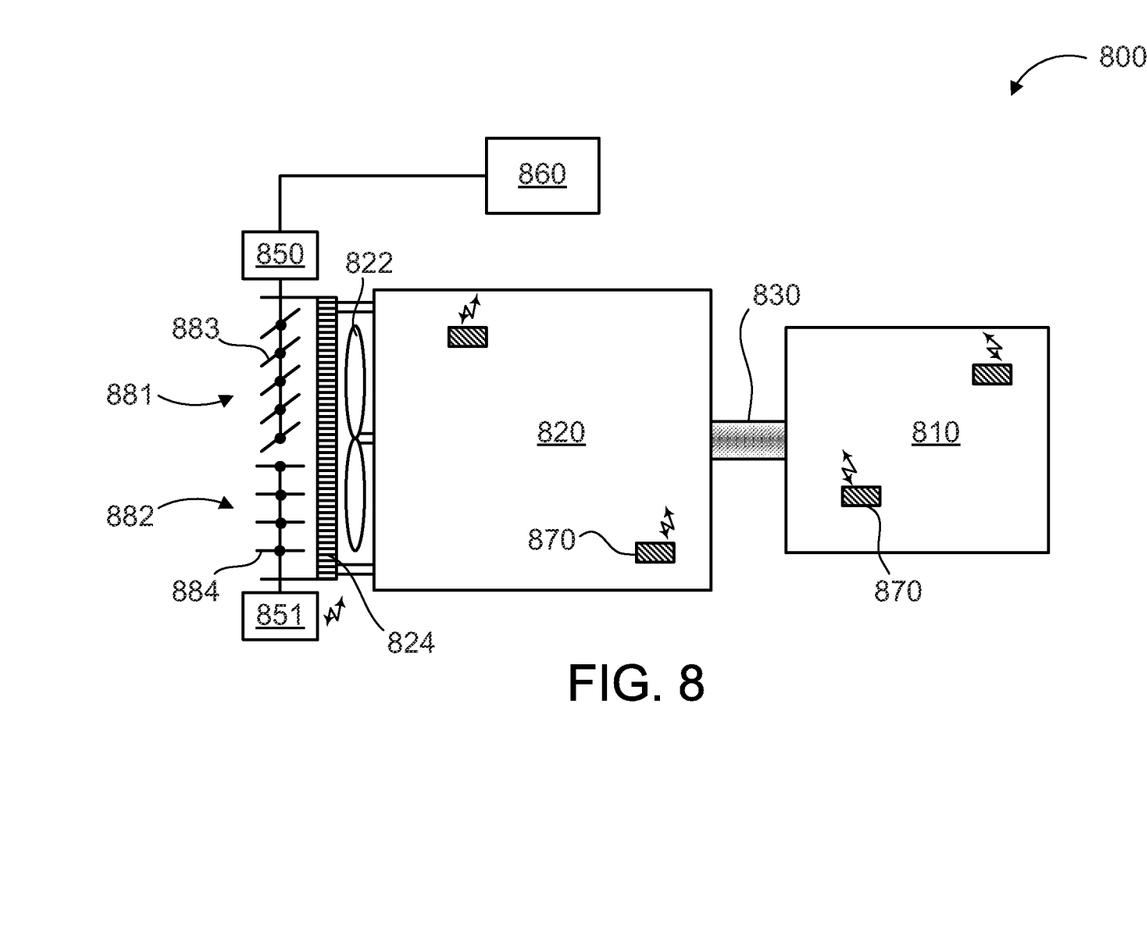
FIG. 8 illustrates a simplified schematic view of a power generation system having an adjustable shutter with multiple zones, according to an aspect of the present invention.

FIG. 8 illustrates a simplified schematic view of a power generation system 800, according to an aspect of the present invention. The power generation system 800, which may be a genset, includes an engine 820 mechanically coupled via shaft 830 to a generator 810. In a genset application, the power generation system 800 is configured to generate electrical power. The engine 820 includes a fan 822 mechanically coupled to the engine 820, and the fan 822 is configured to operate at a substantially constant speed when the engine is operating under normal loads. The fan 822 forces a coolant medium (e.g., air) through a radiator 824.

The engine 820 is cooled by a ventilation system. The ventilation system includes a ventilation inlet (which is the space around the engine and behind the fan), a ventilation outlet (which is downstream of the adjustable shutters 881, 882), the adjustable shutters 881, 882 and actuators 850, 851. The adjustable shutter 881 is comprised of multiple louvers 883 mechanically coupled to the actuator 850. The adjustable shutter 882 is comprised of multiple louvers 884 mechanically coupled to the actuator 851. The adjustable shutters 881, 882 are individually controllable and form two zones of adjustable shutters, and therefore two zones of cooling. The controller 860 is configured to instruct the actuators to open or close the adjustable shutters by specific amounts. The actuators may be connected to the controller 860 via a physical connection (e.g., a wire) as shown with actuator 850, or by a wireless link as shown with actuator 851.

The controller 860 may also communicate with one or more temperature sensors 870 located in or near the power generation system 800. The temperature sensors 870 may be placed near, inside or outside the generator 810 and the engine 820. For example, the temperature sensors 870 may be configured to detect an air temperature, a cooling fluid temperature, an oil temperature an engine temperature, a generator temperature or any other desired parameter as desired in the specific application. The temperature sensors 870 may be connected to the controller 860 via a wired or wireless communication medium. Based on the received temperature values, and possibly machine parameters, the controller 860 is configured to control the position of the adjustable shutters 881, 882.

The multiple zones of adjustable shutters enables more precise cooling of specific regions of the power generation system 800 and radiator 824. As one example only, by opening the bottom adjustable shutter 882 more than the top adjustable shutter 881, more cooling air can be directed over the lower portions of the radiator 824. This targeted and controllable configuration for cooling has demonstrated substantially improved machine efficiencies, and the amount of machine efficiency improvement was unexpected.

Figure 9:
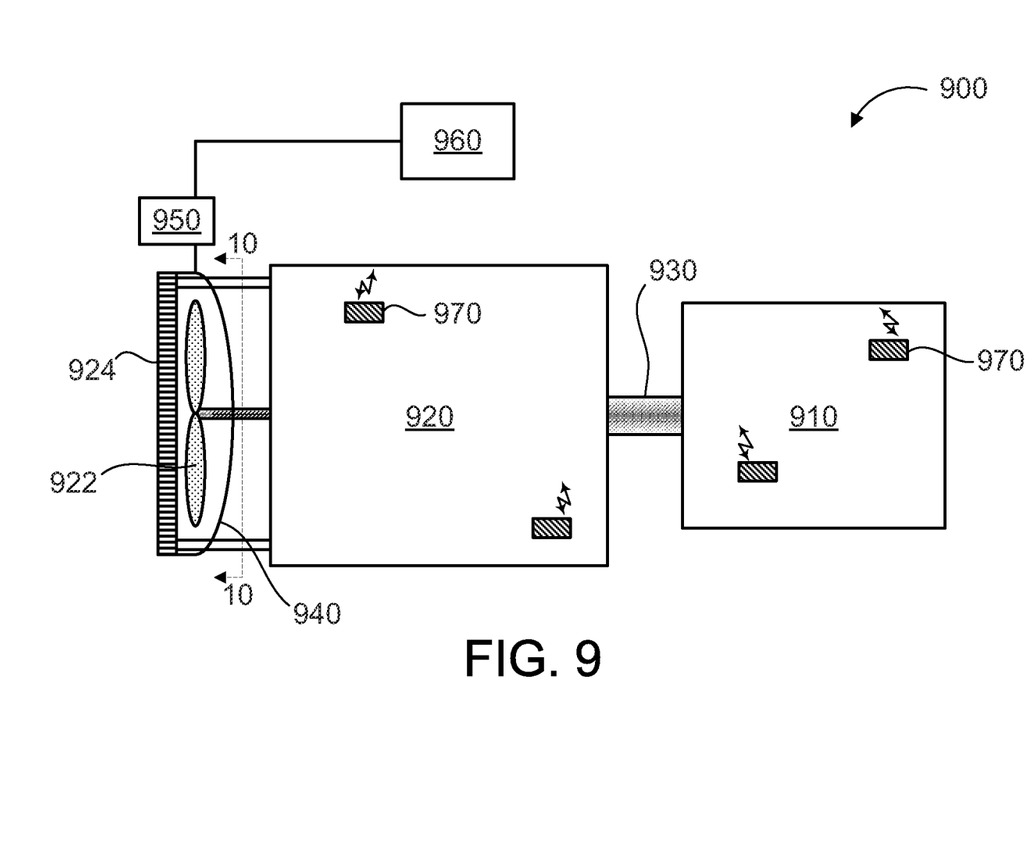
FIG. 9 illustrates a simplified schematic view of a power generation system having an adjustable shutter, according to an aspect of the present invention.

FIG. 9 illustrates a simplified schematic view of a power generation system 900, according to an aspect of the present invention. The power generation system 900, which may be a genset, includes an engine 920 mechanically coupled via shaft 930 to a generator 910. In a genset application, the power generation system 900 is configured to generate electrical power. The engine 920 includes a fan 922 mechanically coupled to the engine 920, and the fan 922 is configured to operate at a substantially constant speed when the engine is operating under normal loads. The fan 922 forces a coolant medium (e.g., air) through a radiator 924.

The engine 920 is cooled by a ventilation system. The ventilation system includes a ventilation inlet (which is the space located outside shroud 940), a ventilation outlet (which is downstream of the radiator 924). The shroud 940 includes an adjustable member having a series of circumferentially spaced openings (see FIG. 10). The shroud 940 functions as an adjustable shutter in that the opening area can be selectively controlled. The controller 960 is configured to instruct the actuator 950 to open or close the circumferentially spaced openings by specific amounts.

Figure 10:
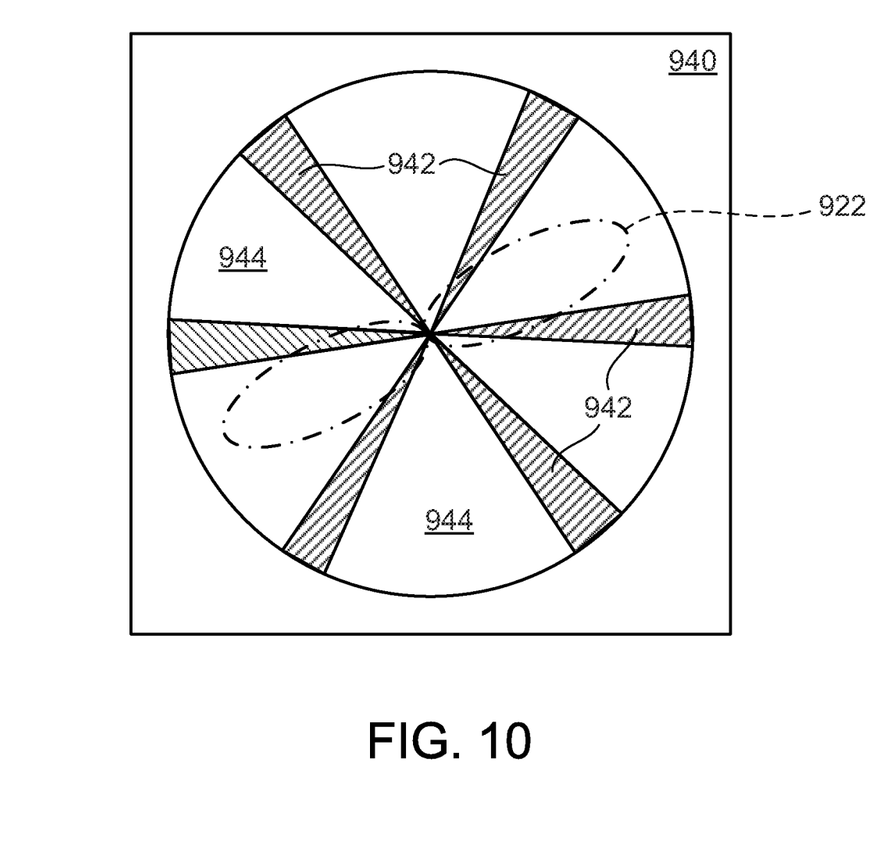
FIG. 10 illustrates a simplified schematic view of a shroud having a series of circumferentially spaced openings, according to an aspect of the present invention.

FIG. 10 illustrates a view along line 10-10, as shown in FIG. 9. The shroud 940 encloses the fan 922 and has a series of circumferentially spaced openings 942 interposed between a series of blocked regions 944. As one example only, a stack of two discs may be used to form the two regions, where each disc is rotatable relative to each other. As a first disc is rotated, the respective openings in the first disc interact with opening in a second disc to effectively increase or decrease the flow area of shroud 940. The actuator 950 controls the respective rotation and positioning of the one or more discs.

The controller 960 may also communicate with one or more temperature sensors 970 located in or near the power generation system 900. The temperature sensors 970 may be placed near, inside or outside the generator 910 and the engine 920. For example, the temperature sensors 970 may be configured to detect an air temperature, a cooling fluid temperature, an oil temperature an engine temperature, a generator temperature or any other desired parameter as desired in the specific application. The temperature sensors 970 may be connected to the controller 960 via a wired or wireless communication medium. Based on the received temperature values, and possibly machine parameters, the controller 960 is configured to control the position of the adjustable shutter or shroud 940.

Figure 11:
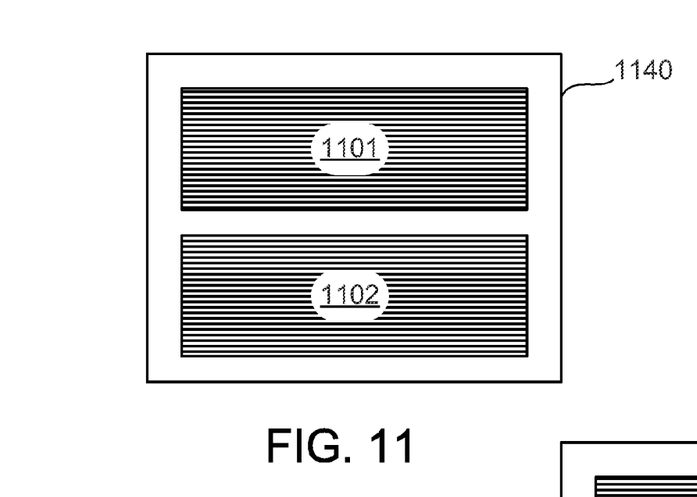
FIGS. 11-13 illustrate a simplified end view of the adjustable shutters.
Figure 12:
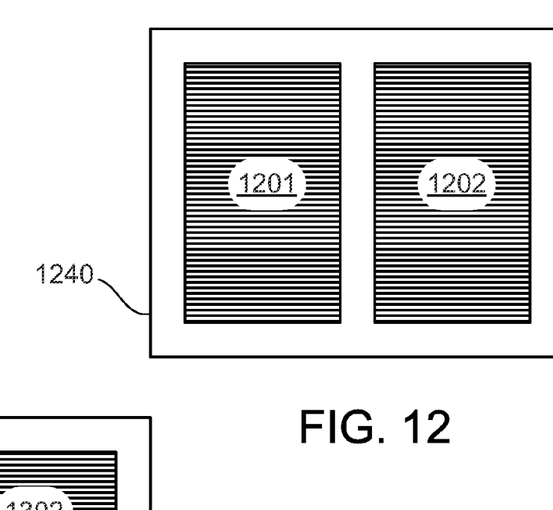
Figure 13:
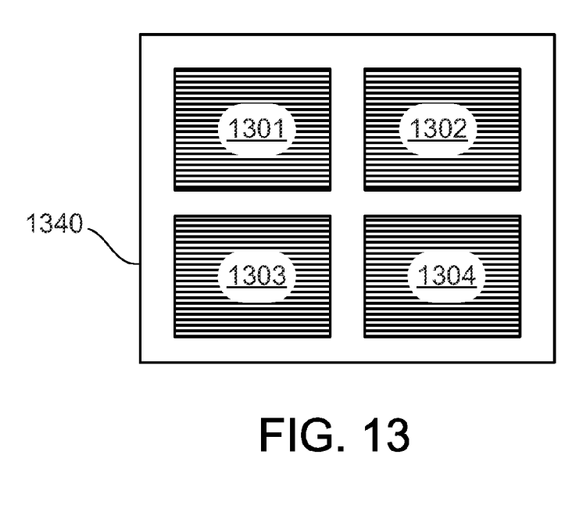

The adjustable shutters may be configured in multiple arrangements. FIGS. 11-13 illustrate simplified schematics of various optional configurations. FIG. 11 illustrates an embodiment where a first set of louvers 1101 (or adjustable shutter) is disposed above a second set of louvers 1102 (or adjustable shutter), both of which may be individually controlled by one or more actuators. FIG. 11 is a similar configuration as shown in FIG. 5. FIG. 12 illustrates an embodiment where a first set of louvers 1201 (or adjustable shutter) is disposed to the left of a second set of louvers 1202 (or adjustable shutter), both of which may be individually controlled by one or more actuators. FIG. 13 illustrates an embodiment where a first set of louvers 1301 (or adjustable shutter) is disposed to the left of a second set of louvers 1302 (or adjustable shutter), and both of these sets of louvers are disposed above a third set of louvers 1303 (or adjustable shutter) and a fourth set of louvers 1304 (or adjustable shutter), all of which may be individually controlled by one or more actuators. The power generation system enclosure is indicated by 1140, 1240 and 1340. Other configurations could also be employed as desired in the specific application.

The split type control mechanism for the adjustable shutters may be used for fine airflow control and enables a change in (or control of) the airflow path inside the enclosure. The temperature variation inside the enclosure is not linear in all places. For example, the load of the engine and generator may be linear, but the temperature of those components is not. The generator temperature is based on the current passing through the generator. The generator current increase/decrease is not only impacted by the load of the machine, but is also impacted by the power factor. Table 1 shows an example scenario that illustrates the nonlinear temperature pattern. All data is assumed to be at the same ambient temperature and humidity.

TABLE 1

| Load | Engine Temperature | Generator Temperature | Generator Power Factor |
|---|---|---|---|
| 1000 kW | 90° C. | 60° C. | 1 |
| 1000 kW | 90° C. | 60° C. + (X1)° C. | 0.9 |
| 1000 kW | 90° C. | 60° C. + X1° C. + X2° C. | 0.8 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power generation system comprising:
    a genset comprising an engine mechanically coupled to a generator, the genset configured to generate electrical power;
    a ventilation system having a ventilation inlet and a ventilation outlet, the ventilation system configured for cooling at least one of the engine and the generator, wherein the ventilation inlet has an inlet adjustable shutter and the ventilation outlet has an outlet adjustable shutter, both adjustable shutters configured for adjusting a flow volume of a coolant medium through the ventilation system;
    one or more temperature sensors disposed in or near the power generating system, the one or more temperature sensors detecting at least one of an air temperature, a cooling fluid temperature, an oil temperature, an engine temperature and a generator temperature; and
    a controller connected to the one or more temperature sensors, the controller configured to control a position of both the inlet adjustable shutter and the outlet adjustable shutter based on data received from the one or more temperature sensors; wherein the adjustable shutter is comprised of an adjustable member having a series of circumferentially spaced openings; and wherein the adjustable member is comprised of a stack of two discs, where each of the two discs is rotatable relative to the other so that as a first disc is rotated openings in the first disc interact with openings in a second disc to effectively increase or decrease a flow area.

2. The power generation system of claim 1, wherein the controller includes a local memory, and the controller is configured to monitor and store events, the local memory is configured to reduce processing time and response time of the controller;
    and the events are used to at least one of generate alarms and fully open the adjustable shutter.

3. The power generation system of claim 1, wherein at least one of the ventilation inlet and the ventilation outlet has two or more zones of adjustable shutters.

4. The power generation system of claim 1, wherein the engine further comprises:
    a cooling fan mechanically connected to the engine, the cooling fan configured to operate at a substantially constant speed when the engine is operating under normal loads.

5. The power generation system of claim 1, further comprising
    a safety mesh located on at least one of the ventilation inlet and the ventilation outlet.

6. A power generation system comprising:
    a genset comprising an engine mechanically coupled to a generator, the genset configured to generate electrical power;
    a ventilation system having a ventilation inlet and a ventilation outlet, the ventilation system configured for cooling at least one of the engine and the generator;
    one or more temperature sensors disposed in or near the power generating system, the one or more temperature sensors detecting at least one of an air temperature, a cooling fluid temperature, an oil temperature, an engine temperature and a generator temperature;
    a controller connected to the one or more temperature sensors, the controller configured to control a position of the adjustable shutter based on data received from the one or more temperature sensors; and
    wherein the ventilation inlet has an inlet adjustable shutter and the ventilation outlet has an outlet adjustable shutter, and both are configured for adjusting a flow volume of a coolant medium through the ventilation system based on the data received from the one or more temperature sensors; wherein the adjustable shutter is comprised of an adjustable member having a series of circumferentially spaced openings; and wherein the adjustable member is comprised of a stack of two discs, where each of the two discs is rotatable relative to the other so that as a first disc is rotated openings in the first disc interact with openings in a second disc to effectively increase or decrease a flow area.

7. The power generation system of claim 6, wherein the controller includes a local memory, and the controller is configured to monitor and store events, the local memory is configured to reduce processing time and response time of the controller; and the events are used to at least one of generate alarms and open or close the adjustable shutters by specific amounts.

8. The power generation system of claim 6, wherein at least one of the ventilation inlet and the ventilation outlet has two or more zones of adjustable shutters.

9. The power generation system of claim 6, further comprising
a safety mesh located on at least one of the ventilation inlet and the ventilation outlet.

10. The power generation system of claim 6, wherein the engine further comprises:
a cooling fan mechanically connected to the engine, the cooling fan configured to operate at a substantially constant speed when the engine is operating under normal loads.

11. A power generation system comprising:
a genset comprising an engine mechanically coupled to a generator, the genset configured to generate electrical power, the engine having a cooling fan mechanically connected to the engine, the cooling fan configured to operate at a substantially constant speed when the engine is operating under normal loads;
a ventilation system having a ventilation inlet and a ventilation outlet, the ventilation system configured for cooling at least one of the engine and the generator, wherein the ventilation inlet has an inlet adjustable shutter and the ventilation outlet has an outlet adjustable shutter, both adjustable shutters configured for adjusting a flow volume of a coolant medium through the ventilation system, each of the adjustable shutters comprised of a plurality of adjustable louvers;
one or more temperature sensors disposed in or near the power generating system, the one or more temperature sensors detecting at least one of an air temperature, a cooling fluid temperature, an oil temperature, an engine temperature and a generator temperature;
a controller connected to the one or more temperature sensors, the controller configured to control a position of the adjustable shutters based on data received from the one or more temperature sensors, wherein the controller includes a local memory, and the controller is configured to monitor and store events, the local memory is configured to reduce processing time and response time of the controller; and the events are used to at least one of generate alarms and open or close the adjustable shutters by specific amounts;
a safety mesh located on at least one of the ventilation inlet and the ventilation outlet; and
wherein at least one of the ventilation inlet and the ventilation outlet has two or more zones of adjustable shutters.

12. The power generation system of claim 11, wherein the adjustable shutter is comprised of an adjustable member having a series of circumferentially spaced openings; and
wherein the adjustable member is comprised of a stack of two discs, where each of the two discs is rotatable relative to the other so that as a first disc is rotated openings in the first disc interact with openings in a second disc to effectively increase or decrease a flow area.

* * * * *